United States Patent [19]

Lukkari et al.

[11] Patent Number: 4,579,498

[45] Date of Patent: Apr. 1, 1986

[54] STACKING APPARATUS FOR FORMING A STACK OF A PREDETERMINED SHAPE FROM PIPES OR OTHER SIMILAR LONG PIECES

[75] Inventors: Jorma Lukkari, Oulu; Pekka Broström, Kiviniemi; Viljo Kauppinen; Hannu Luhtaniemi, both of Oulu, all of Finland

[73] Assignee: Rautaruukki Oy, Oulu, Finland

[21] Appl. No.: 617,697

[22] Filed: Jun. 6, 1984

[30] Foreign Application Priority Data

Jun. 16, 1983 [FI] Finland ............................ 832198

[51] Int. Cl.$^4$ ............................................ B65G 57/18
[52] U.S. Cl. .......................................... 414/36; 100/7; 414/43; 414/48; 414/63; 414/71; 414/74; 414/745
[58] Field of Search ................... 414/30, 36, 43, 45, 414/48, 63, 71, 74, 745, 748; 100/7; 193/38, 41; 294/2, 65.5; 198/861

[56] References Cited

U.S. PATENT DOCUMENTS

| 2,635,002 | 4/1953 | Davidson et al. | 294/65.5 |
| 3,262,246 | 7/1966 | Olsen et al. | 100/7 X |
| 4,419,928 | 12/1983 | Klusmier | 414/30 X |

FOREIGN PATENT DOCUMENTS

| 2230715 | 1/1974 | Fed. Rep. of Germany | 414/30 |
| 753772 | 8/1980 | U.S.S.R. | 294/2 |

*Primary Examiner*—Leslie J. Paperner
*Attorney, Agent, or Firm*—McCormick, Paulding & Huber

[57] ABSTRACT

The invention relates to a stacking apparatus for stacking pipes or other similar long pieces into a stack of a predetermined shape for bundling and storage. The purpose is to provide an apparatus in which the stacking need not be interrupted for the duration of the binding up of the bundle and in which, on the other hand, the pipes are not subject to battering. The apparatus includes an assembling table (5) for the pipes (1), a lifting device (7) equipped with electromagnetic gripping means (8) for transferring the pipes, in groups corresponding to a stack layer, from the assembling table, and a stacking table (11) for receiving the layers between adjustable side supports (12). In accordance with the invention there is provided a bundling table (14), which is also equipped with adjustable side supports (12) in such a way that it can be brought to the same shape as the stacking table (11), in which case the bundling table is, furthermore, movable in order to take a bundle from the stacking table (11) for binding and conveying away. The bundling table is preferably arranged below the stacking table (11), in which case the stacking table is divided into two parts, and its parts are transferrable to the sides in such a way that the bundle can be lowered between these parts. The support surface of the assembling table is made up of resilient rails (6) by means of which a magnetic contact with each pipe (1) is ensured. The gripping means is also provided with centering means (9).

4 Claims, 11 Drawing Figures

STACKING APPARATUS FOR FORMING A STACK OF A PREDETERMINED SHAPE FROM PIPES OR OTHER SIMILAR LONG PIECES

The present invention relates to a stacking apparatus for stacking pipes of a circular or angular cross section, or other similar long pieces, into a stack of a predetermined shape for storage, bunding or transportation, the apparatus having an assembling table for the pipes or other similar pieces, and lifting devices, provided with pipe-positioning devices, for lifting the pipes from the said table onto a dividable, horizontal stacking table fitted alongside the assembling table and provided with adjustable side supports.

The handling of pipes or other similar long pieces involves also stacking in various situations. In connection with the manufacture, round pipes are preferably stacked and bound into 3-, 4- or 6-cornered bundles and, for example, pipes having a square cross section respectively into bundles having a square or rectangular cross section.

In the production of welded piping the manufacturing rate on a single production line may be up to 100 meters per minutes of finished, in many cases also painted or otherwise surface-treated pipe.

The stacking apparatus used on a production line should be adaptable to the stacking of pipes of different sizes and shapes, be capable of a high stacking rate, and handle pipes without causing surface damage or unreasonable noise.

Finnish Patent Application No. 813986 introduces one solution for an efficient stacking device for pipes or suchlike, in which the pieces being stacked may, however, get scratched and battered. In another known solution (DE-OS No. 27 26 460), oblong steel pieces are stacked without being dropped and battered by means of a magnetic lifting device, but the apparatus is suitable for stacking only a square bundle.

The object of the present invention is to create an efficient and versatile stacking apparatus suitable for forming a stack of a predetermined shape from both round and square pipes, in which the pipes are not subject to battering, and in which the stacking need not be interrupted for the duration of the binding up of the bundle or other such procedure.

The stacking apparatus according to the invention is characterized in that which is presented in the accompanying claims.

In the stacking apparatus according to the invention, the number of pipes required for one layer in the stack is fed in one batch onto the assembling table. A magnetic lifting device is lowered close to the pipes, and centering means connected to the lifting device center the pipes in relation to the lifting device. By means of the magnetic lifting device the pipes are lifted, transferred to above the stacking table, and lowered into a stack on the stacking table. The stacking table has side stops adjustable according to the shape of the stack, and the whole stacking table is, according to one preferred embodiment, dividable in the middle and capable of being pulled, together with its side stops, aside from under the stack. Below the stacking table there is fitted a vertically movable bundling table, which is equipped with corresponding side supports and which, when the stack is completed, is raised to receive the stack for binding up, at which time the stacking table, divided, is moved to the sides of the stack. The bundling table is lowered to the level of the conveyors, the stacking table is closed, and stacking continues.

Battering of the pipes and noise are avoided by transferring the pipes by means of magnetic lifting devices without dropping them into the stack from the assembling table. The centering means connected to the lifting device determine the position of the pipes and thereby enable the stacking to be programmed in the manner required by the shape of the stack. Owing to the coordination between the stacking table and the bundling table, the stacking need not be interrupted for the duration of the binding up of the bundle and its removal.

The invention is described below in greater detail with reference to the accompanying drawings, in which one embodiment of the invention is described but not limiting the invention to it.

Figure 4:
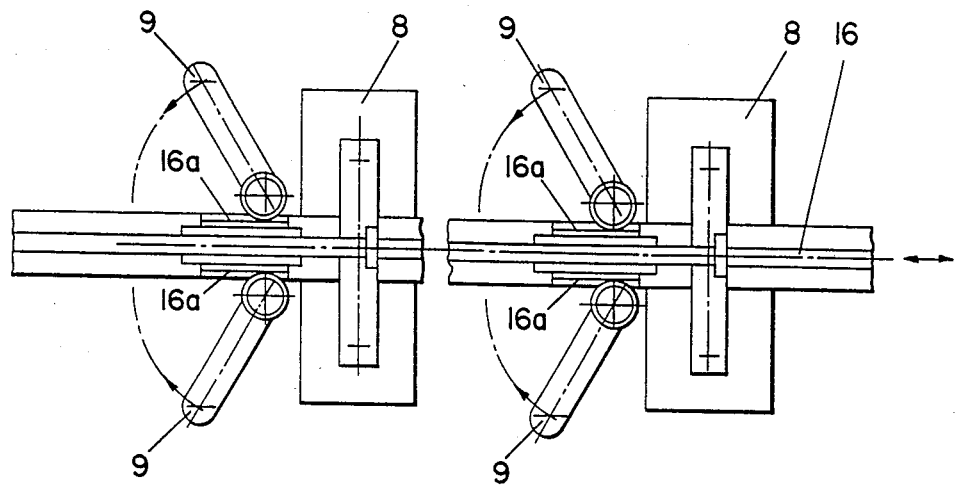
Figure 5:
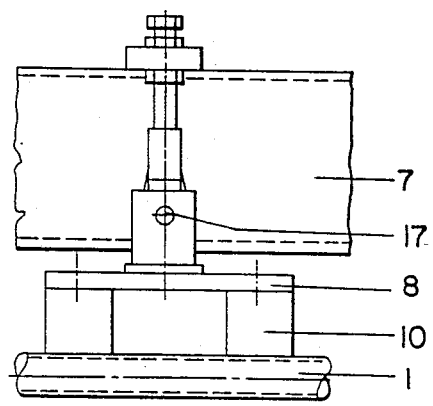
Figure 6:
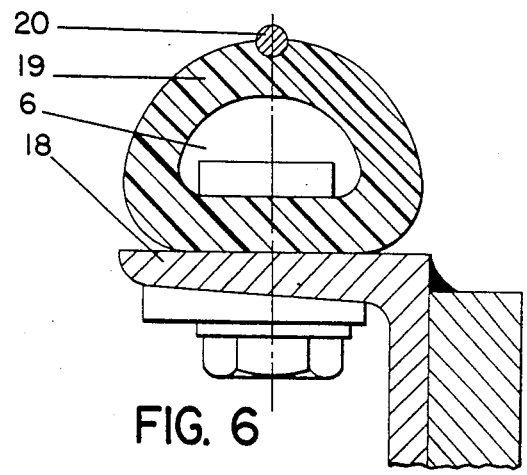

FIGS. 3a–3f inclusively depicts the stacking of round pipes, stage by stage;

FIG. 4 depicts a top view of one embodiment of the centering means;

FIG. 5 depicts one way of suspending the electromagnets of the lifting devices;

FIG. 6 depicts a cross section of one embodiment of the slide surfaces of the assembling table.

Figure 1:
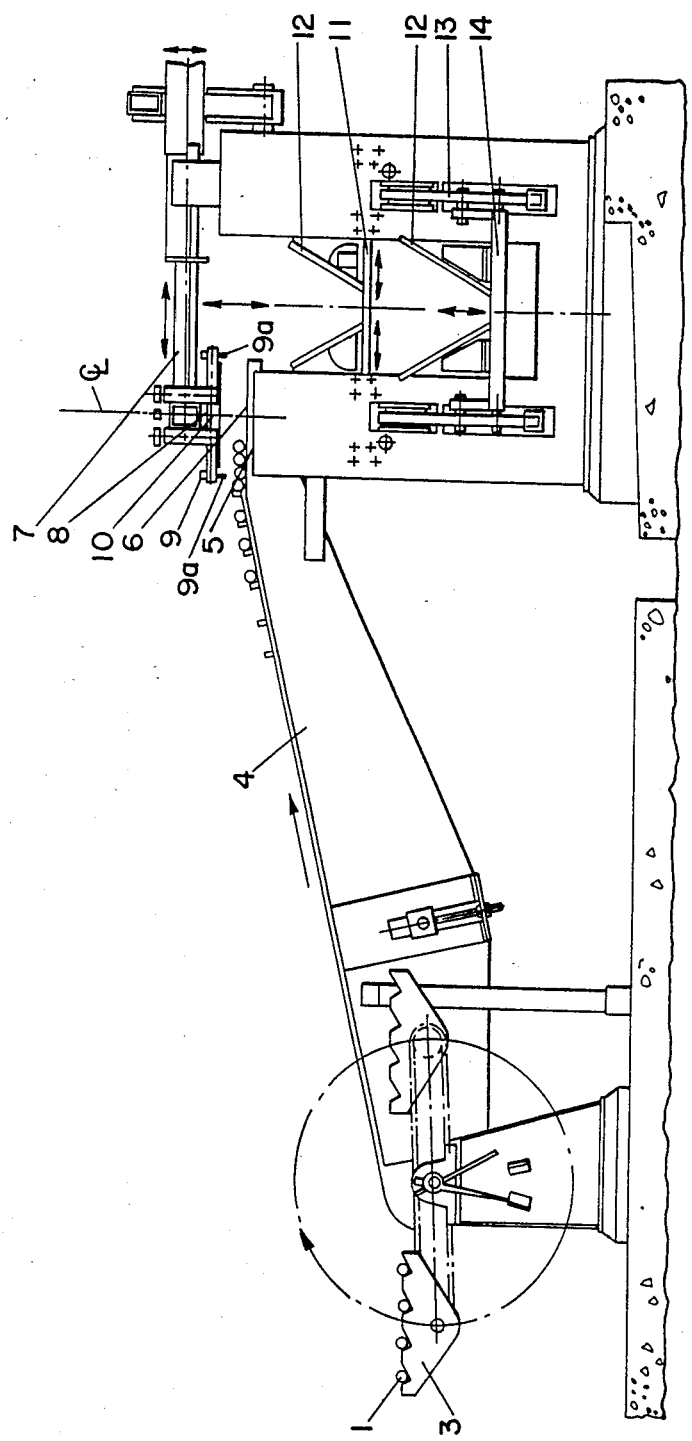
FIG. 1 depicts a schematic side elevation of the apparatus.
Figure 2:
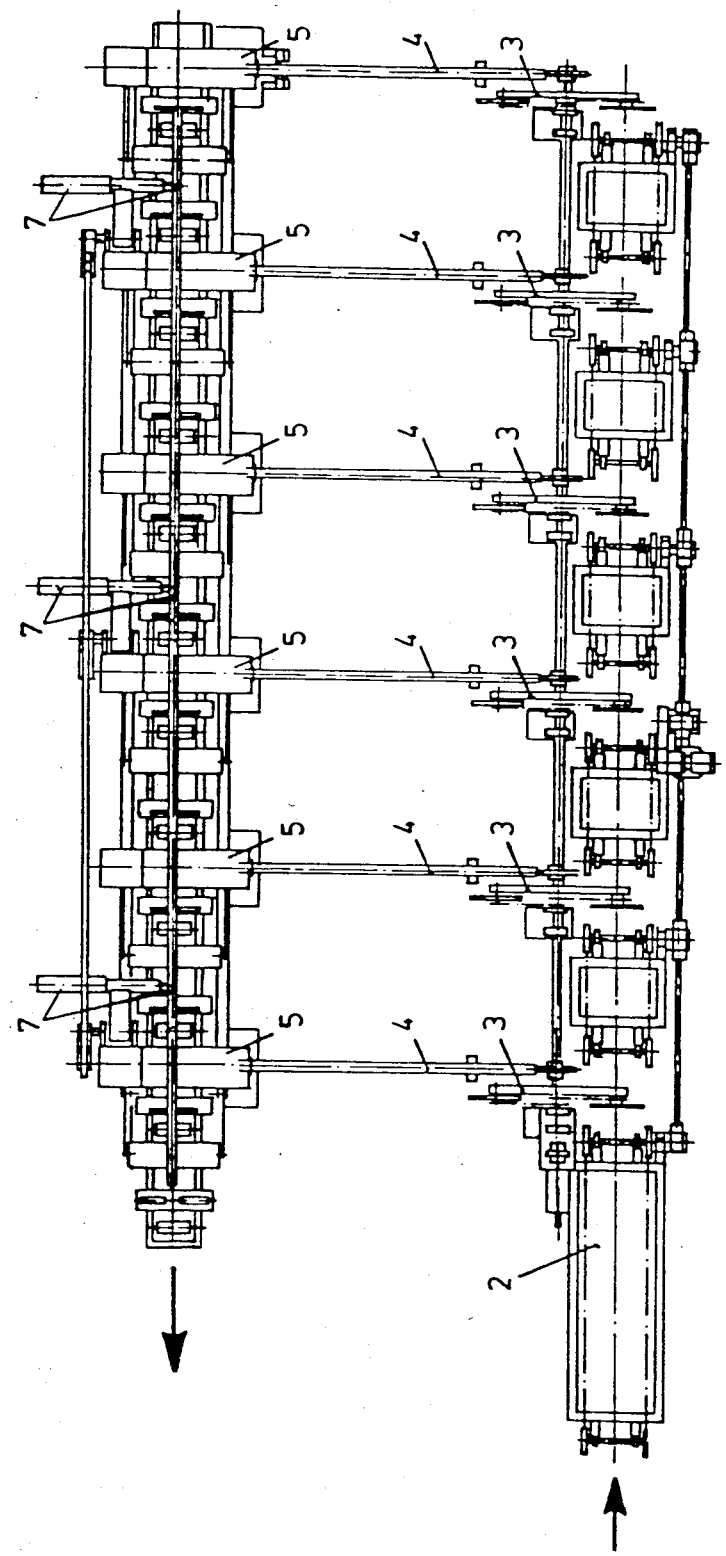
FIG. 2 is a schematic top view of the apparatus.

The embodiment depicted in FIGS. 1 and 2 of the drawings is a stacking apparatus for stacking round pipes into a bundle of a predetermined shape. The pipes 1 are fed by means of a roller conveyor 2 to a pipe-lifting device 3, which lifts the pipes onto a transverse conveyor 4. The transverse conveyor batches the desired number of pipes onto the slide rails 6 of the assembling table 5. The gripping device 8 of the lifting device 7 lowers to a position close to the pipes, and the centering means 9 connected to it center the pipes. The gripping means 8 lower to a position on top of the pipes, and the electromagnets 10 grip the pipes. The lifting device 7 transfers the pipes to above the stacking table 11 and lowers them to between the adjustable side supports 12 on the stacking table. The bundling table 14, fitted below the stacking table 11 and moving on vertical guides 13, lifts the completed stack from the stacking table 11, which opens together with its side supports. The bundling table 14 lowers the bundle to the transport level for binding, the stacking table 11 closes, and the lifting device 7 loads, without interruption, a new stack onto the stacking table.

Figure 3A:
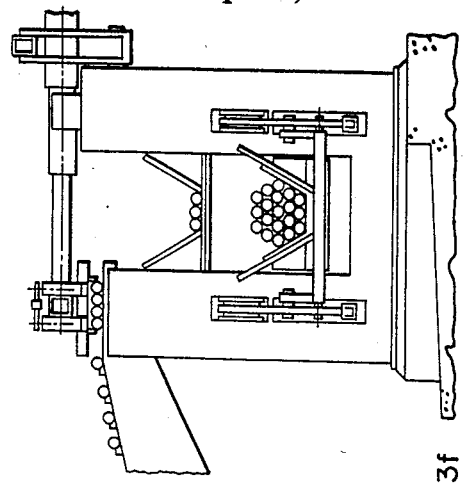
Figure 3B:
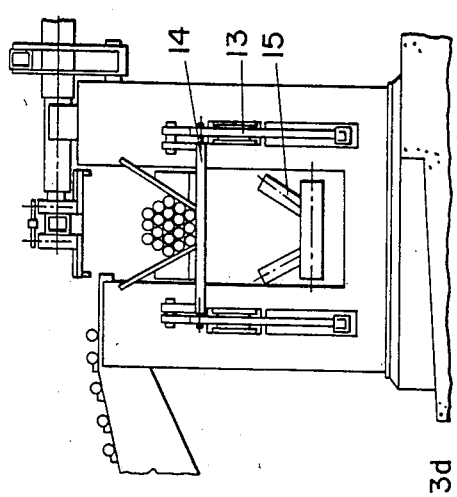
Figure 3C:
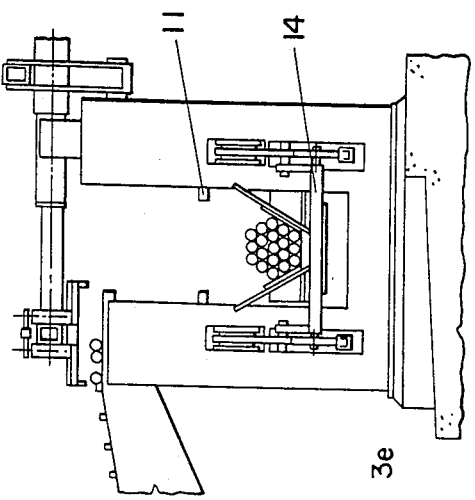
Figure 3D:
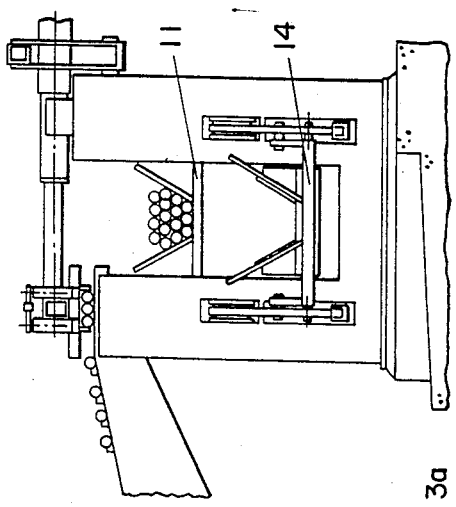
Figure 3E:
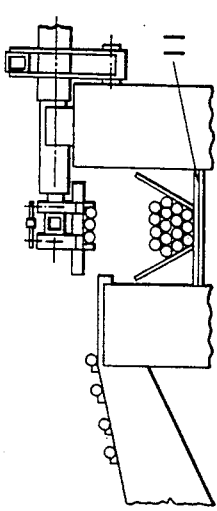
Figure 3F:
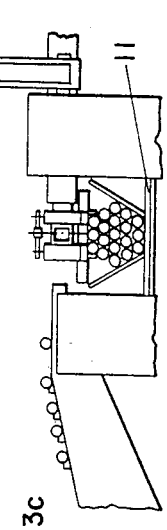

FIGS. 3a–c shows the stacking of round pipes into a stack with a hexagonal cross section, stage by stage. In FIG. 3d the stack is completed and the bundling table 14 has taken the stack from the stacking table. Behind the apparatus there is seen the roller conveyor 15 intended for conveying the bundle away. In FIG. 3e the stacking table 11 is divided and moved aside, and in FIG. 3f the stacking of a new bundle has started during the binding of the previous bundle. In a corresponding manner, square pipes are bound into a square or rectangular bundle, since in the apparatus the pipe need not roll.

When the making of a stack of a different shape is started, the side supports of the stacking and the bundling table are set so as to correspond to the shape of the stack.

FIG. 4 shows the electromagnetic gripping means 8 and the lever-like centering means 9 as seen from above. The symmetrically turning centering means are driven by a toothed bar 16 movable in the direction of the arrow so that portions 16a, 16a engage the inner ends of arms 9, 9 to cause movement of these centering arms in the directions indicated. As shown in FIG. 1 the outer ends of these centering arms 9 include depending jaws 9a for engaging the pipes in the manner suggested in FIGS. 3a, 3b and 3c.

The use of a magnetic lifting device for lifting several pipes simultaneously is not very simple in practice. The pipes are often bent, and angular pipes are additionally twisted, for which reason it is difficult to cause the gripping magnet to touch each pipe. In this case the problem has been solved by securing the gripping means 8, which include the electromagnets 10, to the lifting device 7 by means of an articulation 17 (FIG. 5) and by using resilient slide rails 6 on the assembling table 5. FIG. 6 shows how the slide rail 6 is made up of a frame 18, a resilient, for example rubber, rail 19, and, for example, a metallic slide surface 20. When the pipes are gripped the gripping means 8 presses, for example, by gravity, the raised pipes against the slide rails 6, thereby forcing, in conjunction with the resilience of the slide rails 6, the pipes 1 to the level of the gripping magnets 10.

The functions of the stacking apparatus according to the invention are controllable automatically by means of generally known techniques.

We claim:

1. Apparatus for forming an array of elongated articles by bundling the articles in a predetermined cross sectional configuration, and comprising:
    (a) means for forming a first layered group of elongated articles at first station (assembling table 5),
    (b) means for gripping each layered group of elongated articles at said first station,
    (c) means for picking up the gripped articles and transferring these articles to a second station spaced transversely with respect to the first station without disturbing the relative orientation of these articles with respect to one another in the group,
    (d) means for lowering said layered group of articles so supported by said pickup means to a third station spaced below the second station said second and third station being in a common vertical plane,
    (e) outwardly and upwardly inclined side supports for receiving successively lowered layered groups of articles one on top of another to form an array of a predetermined cross sectional configuration at said third station,
    (f) means for lowering said outwardly and upwardly inclined side supports and the array of articles therein from said third to a fourth station spaced below the third station and occupying the same relationship relative to said vertical plane so that the articles can be conveniently bundled at said fourth station concurrently with further forming of successive layers of articles between said upwardly and outwardly inclined side supports at said third station.

2. Apparatus according to claim 1 wherein said means for gripping said layers of articles comprises a plurality of simultaneously operated centering arms having article gripping jaws at the outer free ends of said arms, said arms being arranged in pairs, a longitudinally reciprocable member having portions engageable with inner ends of said centering arms so that said arms are rotated adjacent their inner ends in order to move said jaws toward the layered group of elongated articles and move these articles into a predetermined position relative to an axis of symmetry between said paired centering arms.

3. The apparatus according to claim 2 wherein said article pickup means comprises an electromagnetic device especially suited for holding elongated articles of paramagnetic material.

4. The apparatus according to claim 3 wherein said pickup means further comprises a plurality of horizontally reciprocable devices (7), each device having a movable portion, said centering arms and said longitudinally reciprocable member provided on said movable portion, and articulated means for said gripping means also provided on said movable portion to allow limited tilting movement of said gripping means relative said movable portion of said reciprocable device.

* * * * *